3,383,378
POLYMERIZATION OF ETHYLENE
Herman S. Bloch, Skokie, and Ernest L. Pollitzer, Hinsdale, Ill., assignors to Universal Oil Products Company, Des Plaines, Ill., a corporation of Delaware
No Drawing. Filed Apr. 22, 1964, Ser. No. 361,899
12 Claims. (Cl. 260—94.9)

This invention relates to a novel process for the polymerization of ethylene. More specifically, the invention is concerned with a process for polymerizing ethylene in the presence of a novel catalytic composition of matter.

The use of detergents has increased at a very rapid rate over the past several years. The detergents have supplanted soaps as cleansing agents due to the superior cleansing ability of the detergents. The detergents comprise, for the most part, alkylbenzenes which have been sulfonated and converted to the alkali metal salt thereof. However, most of the detergents now in use have an objectionable feature which is becoming more readily apparent due to the overwhelming use of these detergents. This objectionable feature is that said detergents are not biodegradable. That the detergents are not biodegradable is readily apparent because many rivers and streams into which sewage or wash water is dumped will contain suds and foam which is not degraded due to bacterial action thereupon. These large masses of foam and suds have become menaces to public health inasmuch as the suds have found their way into sources of drinking water of various communities. One theory concerning the non-biodegradability of the present day detergents is that the objectionable feature is due to the fact that the long alkyl chain is highly branched and is therefore resistant to the action of bacteria thereon. Therefore, it is necessary that compounds which possess surface active and detergent characteristics or properties must, in the future, be susceptible to biodegradation. One method of obtaining compounds which possess the desirable characteristics is to prepare an alkylbenzene in which the alkyl chain is of relatively long length and is either straight-chain or only slightly branched in configuration, said alkylbenzenes being capable of conversion to sulfonate detergents which are biodegradable.

It is therefore an object of this invention to provide a process for the polymerization of olefinic hydrocarbons, and particularly ethylene, to prepare useful chemical intermediates.

A further object of this invention is to provide a process for the polymerization of ethylene in the presence of a novel composition of matter whereby the resultant polymer comprises a mixture of a high molecular weight solid and a slightly branched liquid olefin.

In a broad aspect one embodiment of this invention resides in a process for the polymerization of ethylene which comprises treating said ethylene at polymerization conditions with a catalyst comprising an alkali metal hydride disposed on a high surface area, substantially anhydrous solid support which has been promoted by the addition of a compound selected from the group consisting of the salts and hydroxides of the alkali metals and alkaline earth metals and thereafter calcined, and recovering the resultant polymers.

Another embodiment of this invention is found in a process for the polymerization of ethylene which comprises treating said ethylene at a temperature in the range of from about 80° to about 200° C. and at a pressure in the range of from about 500 to about 2500 p.s.i.g. in the presence of a diluent comprising a normal paraffin with a catalyst comprising an alkali metal hydride disposed on a substantially anhydrous alumina having a surface area of from about 25 to about 500 square meters per gram which has been promoted by the addition of a compound selected from the group consisting of the salts and hydroxides of the alkali metals and alkaline earth metals and thereafter calcined, and recovering the resultant polymers.

Yet another embodiment of this invention resides in a polymerization catalyst comprising an alkali metal hydride disposed on a high surface area, substantially anhydrous solid support which has been promoted by the addition of a compound selected from the group consisting of the salts and hydroxides of the alkali metals and alkaline earth metals, and thereafter calcined.

A specific embodiment of this invention is found in a process for the preparation of solid polymers and liquid olefinic polymers which comprises treating said ethylene at a temperature in the range of from about 80° to about 200° C. and at a pressure in the range of from about 500 to about 2500 p.s.i.g. in the presence of a diluent comprising a normal paraffin with a catalyst comprising sodium hydride disposed on a substantially anhydrous gamma-alumina having a surface area of from about 25 to about 500 square meters per gram which has been promoted by the addition of a compound selected from the group consisting of the salts and hydroxides of the alkali metals and alkaline earth metals and thereafter calcined, and recovering the resultant polymers.

Another specific embodiment of this invention is found in a polymerization catalyst comprising potassium hydride disposed on a substantially anhydrous gamma-alumina support which has been promoted by the addition of lithium nitrate and thereafter calcined.

Other objects and embodiments will be found in the following further detailed description of this invention.

As hereinbefore set forth, the polymerization of ethylene according to the process of this invention is effected in the presence of a novel catalytic composition of matter which comprises an alkali metal hydride disposed on a promoted solid support to prepare certain polymeric products. The solid support preferably comprises a high surface area, substantially anhydrous metal oxide which has been pretreated with a compound selected from the group consisting of the salts and hydroxides of the alkali metals and alkaline earth metals and thereafter calcined prior to the addition of the alkali metal hydride. The polymeric products which are obtained according to the process of the present invention will comprise high molecular weight solids and straight-chain or slightly branched liquid olefins. The former products comprise waxy solids having a melting point of from about 125° to about 130° C. or more and may be utilized in the manufacture of polishes, wax coatings, plasticizers, resins, etc.; while the latter polymeric products which comprise olefins containing from about 8 to about 18 carbon atoms in length and, as hereinbefore set forth, are straight-chain or slightly branched in configuration may be used in the manufacture of chemical intermediates such as alkylbenzenes which are capable of being converted to sulfonate detergents, the latter possessing the desirable characteristic of being biodegradable in nature, while the exact mechanism of the reaction occurring during the polymerization step is not completely understood, it is our belief that two distinct types of products, namely solid and liquid polymers, are formed as the result of two separate but simultaneous or competitive reactions. In view of this it is totally unexpected that two distinct products are obtained with practically no intermediate products; that is, the polymers formed are not merely a continuous spectrum of molecular weights. For example, the molecular weight of the liquid olefinic polymer is about 250, while the molecular weight of the solid polymer will range from 1,000 up to 100,000 or more.

The particular and novel catalytic compositions of matter which are utilized in the process of the present invention comprise, as hereinbefore set forth, alkali metal hydrides disposed on a promoted solid support. The term "promoted" as used in the specification and in the appended claims will refer to a pretreatment of the solid support with a compound selected from the group consisting of the salts and hydroxides of the alkali metals and alkaline earth metals. Examples of salts and hydroxides which may be used include lithium hydroxide, sodium hydroxide, potassium hydroxide, rubidium hydroxide, cesium hydroxide, magnesium hyroxide, calcium hydroxide, strontium hydroxide, barium hydroxide, lithium nitrate, sodium nitrate, potassium nitrate, calcium carbonate, magnesium carbonate, sodium carbonate, lithium carbonate, etc.; decomposable organic salts of the alkali metals and alkaline earth metals such as lithium acetate, sodium oxalate, etc., said hydroxides or salts completely neutralizing the acidity of the solid support and therefore preventing any acid catalyzed side reactions which might tend to occur.

The preferred supports which are neutralized in the process of this invention are those which are relatively or substantially free from water. In most cases this freedom from water of the support is achieved by a precalcination treatment of said support. This precalcination treatment is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram and which has been freed from adsorbed water and which contains little combined water is a satisfactory suppport. Celite, a naturally occurring mineral, after precalcination, is not a satisfactory support. Celite has a surface area of from about 2 to about 10 square meters per gram. Likewise, alkali metal dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion, the limitation on the use of any particular support is one of freedom from combined or adsorbed water in combination with the surface area of the support selected. In addition to the aforementioned type of support, another type is that which is prepared from an alkali aluminate such as sodium aluminate, potassium aluminate, etc. from which a substantial majority of the alkali metal has been removed leaving only the alumina with a relatively minor amount of the alkali metal present. In addition to the aforementioned aluminas, it is also contemplated that other refractory oxide supports including silica gel, silica-alumina composite, silica-zirconia, silica-magnesia, etc., which possess a surface area in the range of from about 25 to about 500 square meters per gram and have been pretreated with a compound of the type hereinbefore set forth to completely neutralize the acidity of the support, may also be utilized in the process of the present invention.

The desired support, which possesses the necessary high surface area, preferably, although not necessarily, gamma-, eta- or theta-alumina, is pretreated with a promoter in any manner. One method of impregnating the solid support is to treat said support with a solution of an alkali metal salt or hydroxide or an alkaline earth metal salt or hydroxide of the type hereinbefore set forth, dry the resultant composite and thereafter calcine said composite at a temperature usually in the range of from about 500° to about 700° C. for a period of from about 1 to about 4 hours in the presence of air before adding the alkali metal thereto.

The desired novel catalytic composition of matter is then prepared by disposing an alkali metal selected from the group consisting of lithium, sodium, potassium, rubidium and cesium, and preferably sodium or potassium due to the relatively large amount of these metals available and the correspondingly lower cost of the same, on the promoted or non-acidic high surface area, substantially anhydrous solid support in any conventional manner, and subsequently converting the metal to its hydride. For example, the promoted metal oxide support and the predetermined amount of the alkali metal may be placed in an appropriate apparatus which is thereafter heated to a temperature exceeding the melting point of the metal. The metal in a molten state will then be disposed on the surface of the solid support in such a manner as to impart certain catalytic characteristics to the finished composite. Alternatively, the alkali metal may be added to a liquid ammonia solution which is thereafter admixed with the promoted solid support and the liquid ammonia subsequently evaporated off thus leaving the alkali metal disposed on the surface of the promoted metal oxide support. The catalytic composition of matter containing the alkali metal disposed on the promoted metal oxide support is then subjected to hydrogenation at elevated temperatures ranging from about 100° to about 700° C. and preferably from about 150° to about 300° C. and at hydrogen pressures ranging from about 15 to about 1,000 p.s.i.g. It is contemplated within the scope of this invention that the alkali metal hydride will be present on the promoted support in an amount within the range of from about 5% to about 25% by weight of the support.

The polymerization process of the present invention, utilizing a novel catalytic composition of matter comprising an alkali metal hydride disposed on a high surface area, substantially anhydrous metal oxide support which has been promoted by the addition of a compound selected from the group consisting of the salts and hydroxides of the alkali metals and alkaline earth metals, in which process ethylene is polymerized to form desired polymers thereof, that is, two distinct products, one a solid, waxy polymer having a molecular weight of from about 1,000 up to 100,000 or more and the other a liquid olefinic polymer having a relatively low molecular weight up to about 250, may be effected in any suitable manner and may comprise either a batch or continuous type operation. As hereinbefore set forth, due to the novel catalytic composition of matter which is herein utilized, the polymers which are obtained from this process will comprise both high molecular weight solids possessing a relatively high melting point and slightly branched liquid olefins. The conditions under which the process of the present invention are effected will include a temperature within the range of from about 80° to about 200° C., a pressure within the range of from about 500 to about 2500 p.s.i.g. and the presence of a diluent, preferably a paraffinic hydrocarbon which is straight chain in configuration and which contains from about 6 to about 10 carbon atoms such as n-hexane, n-heptane, n-octane, n-nonane, and n-decane. It is also contemplated within the scope of this invention that the product distribution in relation to the amount of high molecular weight solid polymers obtained compared to the liquid, slightly branched olefins may be shifted or altered by changing the operating conditions as well as the amount of diluent which is utilized in the process.

An example of a batch type operation in which ethylene is polymerized to form the resultant polymers of the type hereinbefore set forth in greater detail comprises a process in which a quantity of ethylene is charged to an appropriate apparatus such as a rotating autoclave containing the novel catalytic composition of matter comprising an alkali metal hydride disposed on a promoted high surface area solid support. In addition a paraffinic hydrocarbon diluent of the type hereinbefore set forth in greater detail is also present in the reaction vessel. The vessel is then heated to a temperature within the range of from about 80° to about 200° C. while maintaining an elevated pressure within the range of from about 500 to about 2500 p.s.i.g., the amount of pressure utilized being that which is sufficient to maintain a substantial portion of the reaction mixture in liquid phase. At the end of the predetermined residence time, the apparatus such as a rotating autoclave is allowed to cool to room temperature. The excess pressure is vented and the resultant polymers comprising, as hereinbefore set forth, a mixture of a high molecular weight solid polymer and a slightly branched liquid olefin of from about 8 to about 18 carbon atoms in length are recovered.

The polymerization process of the present invention may also be effected in a continuous type operation, a particularly suitable type of operation utilizing the novel catalytic composition of matter comprising a fixed bed method. In this method the catalyst is disposed on a fixed bed in a reaction zone which is maintained at the proper operating conditions of temperature and pressure. The ethylene feed stock is continuously charged to the reaction zone and maintained in said zone for a predetermined residence time. In addition, the inert solvent comprising the paraffinic hydrocarbon is also continuously charged to the reaction zone. Alternatively, the olefinic hydrocarbon comprising ethylene and the organic solvent may be admixed prior to entry into said reaction and charged thereto in a single stream. Upon completion of the desired residence time, the polymers are continuously discharged and recovered and separated by conventional means such as filtration or centrifuging into the high molecular weight solid and the liquid olefin. It is also contemplated within the scope of this invention that a moving bed type of operation may be used in which the catalytic composite bed and the ethylene pass either concurrently or countercurrently to each other in the reaction zone. In carrying out the process of this invention in a continuous manner, liquid hourly space velocities may be varied within a relatively wide range of from about 0.1 to about 20 or more, the preferred range being from about 0.1 to about 10.

The following examples are given to illustrate the process of the present invention which, however, are not intended to limit the generally broad scope of the present invention in strict accordance therewith.

EXAMPLE I

A catalyst for the polymerization of ethylene is prepared by placing gamma-alumina which has previously been calcined in a flask and adding thereto a solution of lithium nitrate. The excess water is removed in a rotary steam dryer and the resulting composite is thereafter calcined at a temperature of about 200° C. for a period of 2 hours and at a temperature of about 550° C. for a period of 6 hours. The promoted gamma-alumina is now impregnated with an alkali metal by placing the lithiated alumina in a three-necked flask and adding thereto a predetermined amount of sodium. The flask is then heated to a temperature of about 125° C. while thoroughly agitating the mixture, meanwhile passing nitrogen gas through the system. The sodium which possesses a melting point of 97° C. will melt and be absorbed on the promoted alumina. Following this the final composition of matter which comprises the catalyst of the present invention is prepared by subjecting the alkali metal disposed on the promoted alumina support to hydrogenation, said hydrogenation being effected at a temperature of about 250° C. and a hydrogen pressure of about 25 p.s.i.g.

EXAMPLE II

Another catalyst which may be utilized in the process of this invention is prepared by treating gamma-alumina with a solution of lithium hydroxide. The resultant lithiated alumina is dried and calcined in a manner similar to that hereinbefore set forth. The lithiated alumina is then placed in an appropriate apparatus and metallic potassium added thereto. The apparatus is heated to a temperature of about 90° C. while passing nitrogen through the system. The mixture of molten potassium and promoted alumina is thoroughly agitated during the reaction time. After cooling the composition of matter which comprises potassium disposed on lithiated alumina, the composite is subjected to hydrogenation at a temperature of about 200° C. and a hydrogen pressure of about 15 p.s.i.g. The resulting composite which comprises potassium hydride disposed on lithiated gamma-alumina is thereafter recovered.

EXAMPLE III

Another catalyst is prepared by treating previously calcined gamma-alumina with a solution of lithium nitrate. The resulting composite is dried and calcined at elevated temperatures ranging from 200° to about 550° C. for a total calcination period of about 8 hours. The lithiated gamma-alumina is placed in an appropriate apparatus and the desired alkali metal which, in his instance, comprises sodium is deposited thereon from a liquid ammonia solution. This is effected by dissolving the sodium in liquid ammonia and adding the resultant solution to the lithiated gamma-alumina. The excess liquid ammonia is evaporated and the resultant composite is subjected to hydrogenation as in Example I at a temperature of about 250° C. and a hydrogen pressure of about 25 p.s.i.g. to form the desired catalytic composition of matter comprising sodium hydride composited on a lithiated gamma-alumina support.

EXAMPLE IV

In this example a polymerization catalyst is prepared by treating gamma-alumina with a solution of potassium hydroxide. As in the previous examples, the excess water is removed in a rotary steam dryer and the promoted gamma-alumina is thereafter calcined in the presence of air at temperatures ranging from about 200° to about 550° C. for a period of about 8 hours. Metallic potassium is dissolved in liquid ammonia and the resulting solution is added to the promoted gamma-alumina. The liquid ammonia is evaporated thereby permitting the potassium to be disposed on the surface of the promoted gamma-alumina in an even manner. Following this the composite is subjected to hydrogenation as in Example II at a temperature of about 200° C. and a hydrogen pressure of about 15 p.s.i.g. Upon completion of the hydrogenation step, the desired catalyst comprising potassium hydride disposed on a promoted gamma-alumina support is recovered.

EXAMPLE V

The polymerization of ethylene is effected by placing 50 g. of the catalyst prepared according to Example I above in a stainless steel reactor. The catalyst is placed in the reactor under nitrogen flow and thereafter the tube is sealed. The system is then pressured with dry nitrogen gas following which the charge stock comprising ethylene in an n-heptane diluent is pumped through the reactor at a combined liquid hourly space velocity of about 1.5. The polymerization is carried out at temperatures ranging from about 130°–135° C. and at a pressure of about 1,200 pounds per square inch. The reaction product is collected and subjected to fractional distillation. The liquid cuts boiling from about 100° to about 250° C. will be found to contain a mixture of olefin polymers containing from 8 to about 16 carbon atoms, the major portion of said polymers being straight chain or only slightly branched in configuration. The solids which boil at a temperature greater than 275° C. will comprise waxy solids having a melting point of about 125° to about 135° C.

Additional polymerization reactions involving ethylene in an n-heptane diluent utilizing the catalysts prepared according to Examples II through IV above will disclose similar results, that is, the obtention of liquid polymers boiling from about 100° to about 250° C., said polymers being olefins containing from about 8 to about 16 carbon atoms in length and being straight chain or slightly branched in configuration. In addition, the solid polymeric products obtained will have a melting point of about 125° to about 135° C.

We claim as our invention:

1. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g., with a catalyst comprising an alkali metal hydride disposed on a substantially anhydrous refractory inorganic oxide support having a surface area of from about 25 to about 500 square meters per gram which has been promoted by the addition of a compound selected from the group consisting of the salts and hydroxides of the alkali metals and alkaline earth metals and thereafter calcined, said compound being in sufficient amount to completely neutralize the acidity of said support, and recovering the resultant polymers.

2. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g., with a catalyst comprising an alkali metal hydride disposed on a substantially anhydrous alumina support having a surface area of from about 25 to about 500 square meters per gram which has been promoted by the addition of a compound selected from the group consisting of the salts and hydroxides of the alkali metals and alkaline earth metals and thereafter calcined, said compound being in sufficient amount to completely neutralize the acidity of said support, and recovering the resultant polymers.

3. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g. in the presence of a diluent comprising a normal paraffin, with a catalyst comprising an alkali metal hydride disposed on a substantially anhydrous alumina support having a surface area of from about 25 to about 500 square meters per gram which has been promoted by the addition of a compound selected from the group consisting of the salts and hydroxides of the alkali metals and alkaline earth metals and thereafter calcined, said compound being in sufficient amount to completely neutralize the acidity of said support, and recovering the resultant polymers.

4. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from 500 to about 2500 p.s.i.g. in the presence of a diluent comprising a normal paraffin, with a catalyst comprising an alkali metal hydride disposed on a substantially anhydrous gamma-alumina support which has been promoted by the addition of an alkali metal salt and thereafter calcined, said metal salt being in sufficient amount to completely neutralize the acidity of said support, and recovering the resultant polymers.

5. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g. in the presence of a diluent comprising a normal paraffin, with a catalyst comprising an alkali metal hydride disposed on a substantially anhydrous gamma-alumina support which has been promoted by the addition of an alkali metal hydroxide and thereafter calcined, said hydroxide being in sufficient amount to completely neutralize the acidity of said support, and recovering the resultant polymers.

6. A process for the polymerization of ethylene for the production of a solid polymer of a molecular weight in excess of about 1,000 and a liquid polymer of from about 8 to about 18 carbon atoms and having a molecular weight of up to about 250 which comprises treating said ethylene, at a temperature in the range of from about 80° to about 200° C. and at a pressure in the range of from about 500 to about 2500 p.s.i.g. in the presence of a diluent comprising a normal paraffin, with a catalyst comprising an alkali metal hydride disposed on a substantially anhydrous gamma-alumina support which has been promoted by the addition of lithium nitrate and thereafter calcined, said nitrate being in sufficient amount to completely neutralize the acidity of said support, and recovering the resultant polymers.

7. A process for the polymerization of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g. in the presence of a diluent comprising a normal paraffin, with a catalyst comprising an alkali metal hydride disposed on a substantially anhydrous gamma-alumina support which has been promoted by the addition of lithium hydroxide and thereafter calcined, said hydroxide being in sufficient amount to completely neutralize the acidity of said support, and recovering the resultant polymers.

8. A process for the polymerication of ethylene for the production of a solid polymer of a molecular weight in excess of about 1,000 and a liquid polymer of from about 8 to about 18 carbon atoms and having a molecular weight of up to about 250, which comprises treating said ethylene, at a temperature in the range of from about 80° to about 200° C. and at a pressure in the range of from about 500 to about 2500 p.s.i.g. in the presence of a diluent comprising a normal paraffin, with a catalyst comprising sodium hydride disposed on a substantially anhydrous alumina support having a surface are of from about 25 to about 500 square meters per gram which has been promoted by the addition of a compound selected from the group consisting of the salts and hydroxides of the alkali metals and alkaline earth metals and thereafter calcined, said compound being in sufficient amount to completely neutralize the acidity of said support, and recovering the resultant polymers.

9. A process for the preparation of a solid polymer of a molecular weight in excess of about 1,000 and a liquid olefinic polymer of from about 8 to about 18 carbon atoms and having a molecular weight of up to about 250, which comprises treating ethylene, at a temperature in the range of from about 80° to about 200° C. and at a pressure in the range of from about 500 to about 2500 p.s.i.g. in the presence of a diluent comprising a normal paraffin, with a catalyst comprising potassium hydride disposed on a substantially anhydrous alumina support having a surface area of from about 25 to about 500 square meters per gram which has been promoted by the addition of a compound selected from the group consisting of the salts and hydroxides of the alkali metals and alkaline earth metals and thereafter calcined, said compound being in sufficient amount to completely neutralize the acidity of said support, and recovering the resultant polymers.

10. A process for the preparation of a solid polymer of a molecular weight in excess of about 1,000 and a liquid olefinic polymer of from about 8 to about 18 carbon atoms and having a molecular weight of up to about 250, which comprises treating ethylene, at a temperature in the range of from about 80° to about 200° C. and at a pressure in the range of from about 500 to about 2500 p.s.i.g. in the presence of a diluent comprising a normal paraffin, with a catalyst comprising sodium hydride disposed on a substantially anhydrous gamma-alumina support which has been promoted by the addition of lithium nitrate and thereafter calcined, said nitrate being in sufficient amount to completely neutralize the acidity of said support, and recovering the resultant polymers.

11. A process for the preparation of a solid polymer of a molecular weight in excess of about 1,000 and a liquid olefinic polymer of from about 8 to about 18 carbon atoms and having a molecular weight of up to about 250, which comprises treating ethylene, at a temperature in the range of from about 80° to about 200° C. and at a pressure in the range of from about 500 to about 2500 p.s.i.g. in the presence of a diluent comprising a normal paraffin, with a catalyst comprising potassium hydride disposed on a substantially anhydrous gamma-alumina support which has been promoted by the addition of lithium nitrate and thereafter calcined, said nitrate being in sufficient amount to completely neutralize the acidity of said support, which comprises treating ethylene, at a temperature in the range of from about 80° to about 200° C. and at a pressure in the range of from about 500 to about 2500 p.s.i.g. in the presence of a diluent comprising a normal paraffin, with a catalyst comprising potassium hydride disposed on a substantially anhydrous gamma-alumina support which has been promoted by the addition of lithium nitrate and thereafter calcined, said nitrate being in sufficient amount to completely neutralize the acidity of said support, and recovering the resultant polymers.

12. A process for the preparation of a solid polymer of a molecular weight in excess of about 1,000 and a liquid olefinic polymer of from about 8 to about 18 carbon atoms and having a molecular weight up to about 250, which comprises treating ethylene, at a temperature in the range of from about 80° to about 200° C. and at a pressure in the range of from about 500 to about 2500 p.s.i.g. in the presence of a diluent comprising a normal paraffin, with a catalyst comprising sodium hydride disposed on a substantially anhydrous gamma-alumina support which has been promoted by the addition of lithium hydroxide and thereafter calcined, said hydroxide being in sufficient amount to completely neutralize the acidity of said support, and recovering the resultant polymers.

References Cited

UNITED STATES PATENTS

| | | | |
|---|---|---|---|
| 2,829,136 | 4/1958 | Fotis | 260—94.9 |
| 2,912,422 | 11/1959 | Fotis | 260—94.9 |

FOREIGN PATENTS 917,358  2/1963  Great Britain.

JOSEPH L. SCHOFER, *Primary Examiner.*

F. L. DENSON, *Assistant Examiner.*